Figure 1:
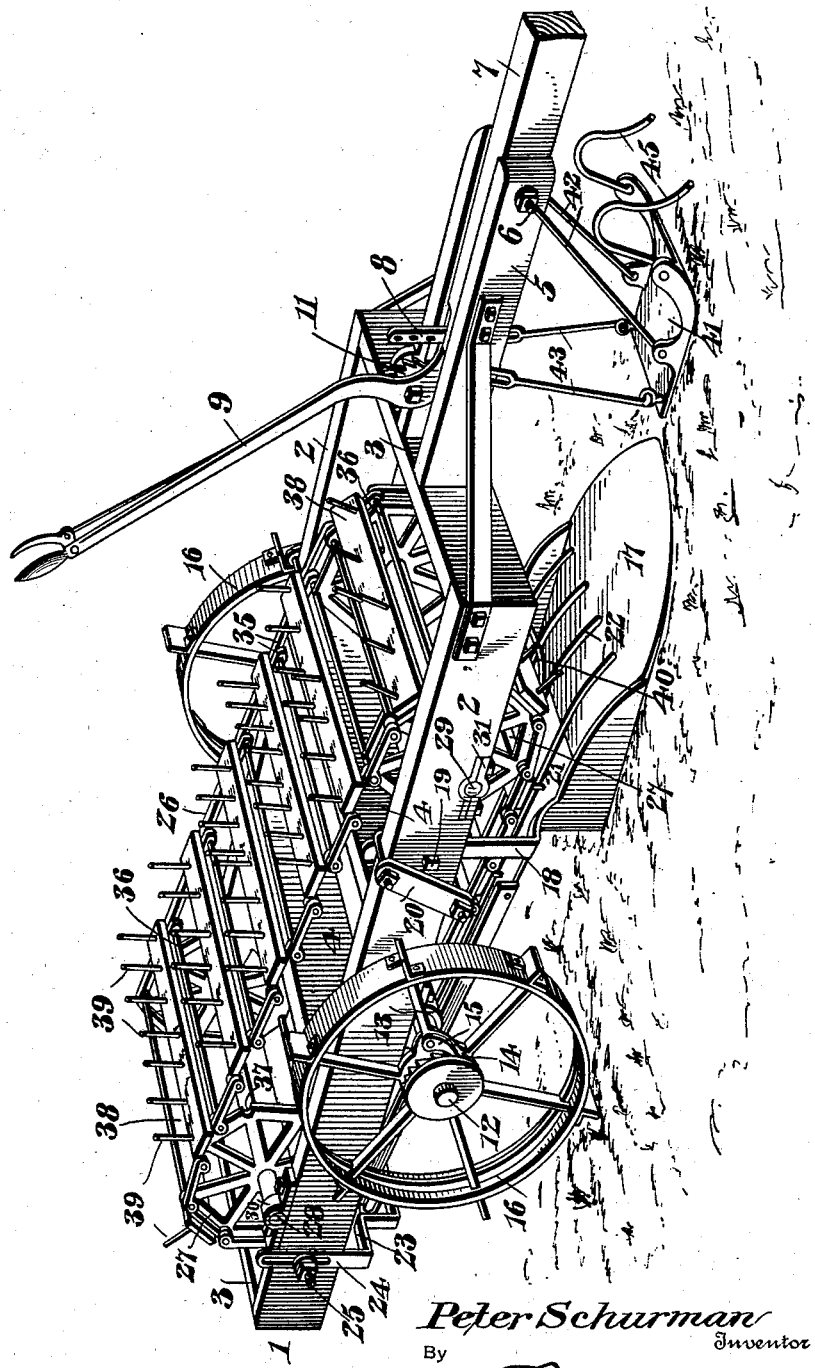

No. 665,939.  
P. SCHURMAN.  
POTATO DIGGER.  
(Application filed Apr. 4, 1900.)  
(No Model.)

Patented Jan. 15, 1901.

2 Sheets—Sheet 1.

Peter Schurman
Inventor

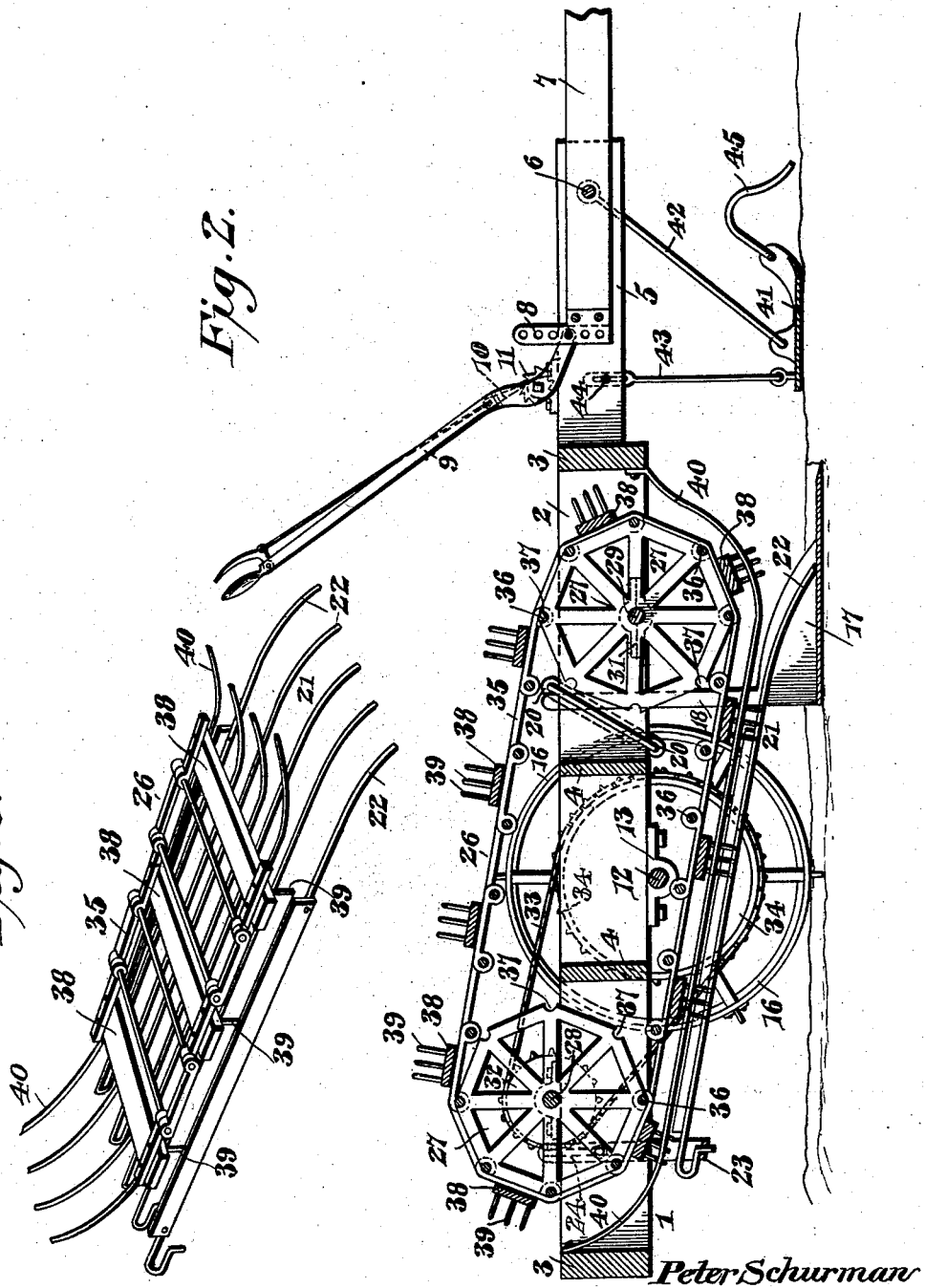

UNITED STATES PATENT OFFICE.

PETER SCHURMAN, OF SUMMERSIDE, CANADA.

POTATO-DIGGER.

SPECIFICATION forming part of Letters Patent No. 665,939, dated January 15, 1901.

Application filed April 4, 1900. Serial No. 11,513. (No model.)

*To all whom it may concern:*

Be it known that I, PETER SCHURMAN, a subject of the Queen of Great Britain, residing at Summerside, in the Province of Prince Edward Island and Dominion of Canada, have invented a new and useful Potato-Digger, of which the following is a specification.

My present invention relates to improvements in potato-diggers; and my object is to produce an agricultural implement of this character which will effectually turn down and compress the stalks of the plants to prevent their interference with the operation of the machine, which will effectually dig the potatoes from the ground and separate them from the earth, and which by reason of certain peculiarities of construction will be readily adaptable to the character of ground desired to be worked, and which, moreover, will be less liable to derangement than other machines of like character with which I am familiar.

To the accomplishment of the foregoing objects and others subordinate thereto my invention consists in mounting the frame of the machine on a pair of supporting and driving wheels and in suitably mounting in said frame a scoop, a screen or separator leading from the scoop, and an endless pulverizer and conveyer driven by the rotation of the supporting-wheels and arranged to pulverize the earth and convey the separated potatoes from the scoop and over the separating-screen to be deposited in a row at the rear of the machine.

The invention further consists in the provision of cleaning-rods or stalk-guards intermediate of the conveyer and screen and in mounting a clearing and compressing device—for instance, a shoe or roller—in front of the scoop in a manner to properly lay the stalks of the potatoes or other vegetation and compress them immediately before they enter the scoop, this feature of the invention being desirable in order to prevent the standing and sometimes twisted stalks from interfering with the operation of the conveyer.

Further peculiarities of construction and arrangement will appear more fully hereinafter, and the entire device will be illustrated in the accompanying drawings, in which—

Figure 1 is a perspective view of my device complete. Fig. 2 is a central longitudinal section therethrough. Fig. 3 is a detail perspective view of a portion of the screen and conveyer, showing the relative arrangement of the cleaning-rods or stalk-guards.

Referring to the numerals of reference indicating corresponding parts in the several views, 1 indicates the frame of my machine, of any suitable construction, but preferably rectangular in shape and comprising side bars 2, end bars 3, and transverse bars 4, connecting and bracing the side bars of the frame. From the forward end of the frame extends, as usual, the tongue-socket 5, suitably braced, and within which is pivotally mounted, as upon a bolt 6, a draft-tongue 7, which is made adjustable to effect the tilting of the frame in a manner to be described by means of a vertical rack 8, engaged by the lower end of a tilting lever 9, designed to be retained in its adjusted position by means of a spring-latch 10, engaging a segmental or circular toothed rack 11. The frame thus constructed is supported at a point intermediate of its length by a transverse shaft 12, carried in suitable bearing-brackets 13, depending from the frame and provided with ratchet-disks 14, designed to be engaged by pawls 15, carried by the hubs of the supporting and driving wheels 16, mounted upon the ends of the shaft 12. By means of this arrangement the device may be backed without causing the rotation of the shaft 12, inasmuch as the pawls on the hubs will ride idly over the teeth of the ratchet-disks; but when the machine is drawn forward the pawls will engage the teeth and cause the rotation of the shaft 12 to effect the actuation of the operative elements of the device in a manner to be described.

Below the forward end of the frame 1 is tiltably suspended the potato scoop or shovel 17 by means of arms 18, diverging upwardly from the rear end of the scoop and pivotally supported by the side bars 2 of the frame a suitable distance in front of the shaft 12, as by means of bolts 19. The upper ends of the arms 18 are extended somewhat above their pivotal points and are adjustably retained by suitable clamping devices 20, carried by the side bars and designed to retain the scoop in the desired position by the retention of the upper ends of the scoop-supporting arms.

21 indicates what might be termed a

"screen" or "separator," comprising a series of parallel horizontally-disposed and slightly upwardly inclined slats or bars 22, having their forward ends curved and resting in or otherwise supported in proximity to the scoop and supported at their rear ends by an adjustable screen-supporting bracket 23, comprising a transverse bar, upon which the screen-bars rest, and upwardly-extending slotted hangers 24, designed to be adjustably retained by compression-bolts 25, carried by the side bars adjacent to their rear ends and extending through the slots of the hangers. By means of the adjustment of this screen-supporting hanger the rear end of the screen or separator may be raised or lowered to obtain the desired inclination of the screen for the purpose of adjusting it relatively to the conveyer 26 in order to accommodate ground of any character and potatoes of varying sizes. This endless conveyer 26 is arranged in horizontally-inclined relation to the frame by being supported upon polygonal conveyer wheels or drums 27, mounted adjacent to the inner sides of the side bars 2 upon transverse conveyer-shafts 28 and 29, journaled in suitable bearing-boxes 30 and 31, located adjacent to the opposite ends of the frame and at the upper and lower edges, respectively, of the side bars, one of these shafts, preferably the upper shaft 28, being provided with a fixed sprocket-wheel 32, geared by a sprocket-chain 33 with a driving sprocket-wheel 34, preferably of greater diameter than the sprocket 32 and keyed or otherwise secured upon the shaft 12 at any suitable point. It will therefore be seen that the propulsion of the device will effect the rotation of the shaft 12 and will cause the conveyer-drums to be rotated for the purpose of imparting motion to the endless conveyer 26.

The specific construction of the conveyer may be varied, provided its arrangement is such that the portion traveling over the screen or separator will carry the potatoes and earth rearwardly from the scoop. I prefer, however, to construct the conveyer as shown in the drawings, in which form a series of metal links 35 are connected in a manner to permit their transverse bars 36 to engage peripheral recesses 37 in the drums 27, alternate links being provided with transverse pin-slats 38, from which extend a series of prongs or pins 39, which as the conveyer travels rearwardly over the separator extend between the bars 22 and serve to pulverize the earth and convey the potatoes to the rear end of the screen, from which they are deposited in a row, the pulverized earth gravitating between the slats.

In devices of this character it sometimes happens that stalks of the potatoes or of other vegetation—as, for instance, weeds—will be deposited upon the conveyer by the scoop and will clog or at least retard the progress of the conveyer by becoming intertwined with the conveyer-teeth and possibly with the bars of the screen. This objectionable result I propose to eliminate by the employment of a series of stalk-guards or cleaning-rods 40, arranged in transverse series and extended under the lower portion of the conveyer in alternate arrangement with the teeth or prongs 39 and having their opposite ends curved upwardly and connected in any suitable manner to the end bars 3 of the frame. Thus as the stalks are urged rearwardly by the conveyer they are prevented from becoming entangled in the operative parts, and as the conveyer rises from the screen at the rear end of the machine the teeth or prongs are drawn upwardly between the guards 40, and any vegetation or other debris which may be adhering to said pins will be removed and deposited in the rear of the machine. This arrangement is quite effective for the clearing of the teeth; but in order to properly lay and compress the stalks in advance of the scoop, as well as to guide the latter over any abrupt construction, I provide the stalk laying and compressing device or shoe 41, which is preferably a substantially flat metal plate having its front and side edges turned up and supported in front of the scoop by a pair of rearwardly-inclined brace-rods 42, pivotally connected at their lower ends to the shoe, and by slotted hangers 43, likewise pivotally connected to the shoe at its rear end and designed to have free longitudinal movement, which is accommodated by pins 44, projecting from the socket and passed through the slots of the hangers. By this means the shoe will be permitted to yield vertically unless it meets with an unusual obstruction, in which event the hangers having reached the upward limits of their movement will cause the frame to be tilted and the scoop to be raised to prevent the derangement of the latter.

45 indicate a pair of upwardly and forwardly diverging stalk-guides carried at the front end of the shoe and having their front ends bent downwardly to bring them into close proximity to the ground for the purpose of laying and properly arranging the vegetation in order that it may be properly compressed by the shoe before being thrown back upon the screen or separator by the action of the scoop.

From the foregoing it will be observed that I have produced a simple and efficient potato-digging machine by means of which potatoes or the like may be removed from the ground, properly separated from the soil, and deposited at the rear of the machine; but while the present embodiment of my invention appears at the present time to be preferable I do not wish to limit myself to the structural details defined, but reserve the right to effect such changes, modifications, and variations as may come properly within the scope of the protection prayed.

What I claim is—

1. In a potato-digger, the combination with a frame and wheels, of an adjustable scoop carried by the frame, a screen having its front end extended loosely into the scoop, a conveyer mounted in the frame, and a screen-adjusting device adjustably carried by the frame and supporting the rear end of the frame to effect the adjustment of the latter toward or from the conveyer.

2. In a potato-digger, the combination with a frame and supporting-wheels, of an adjustable scoop carried by the frame, a screen composed of a transverse series of longitudinally-disposed parallel bars supported at their forward ends by the scoop, an adjustable hanger comprising a transverse bar adjustably supporting the rear end of the screen, an endless conveyer mounted in the frame and provided with pins designed to travel between the bars of the screen, and means for actuating the conveyer from the supporting-wheels.

3. In a potato-digger, the combination with a frame and an endless conveyer provided with transverse series of pins, of stalk-guards passed under the conveyer between the pins and connected at their opposite ends to the frame.

4. In a potato-digger, the combination with a frame and supporting-wheels, of an endless conveyer operatively connected with said wheels and comprising transverse series of pins, stalk-guards passed under the conveyer intermediate of the pins and connected at their opposite ends to the frame, a scoop adjustably carried by the frame, a screen or separator in operative relation to the conveyer and comprising longitudinally-disposed bars supported at their forward ends by the scoop, and means for effecting the adjustment of the rear end of the screen.

5. In a potato-digger, the combination with a frame and supporting-wheels, of a scoop, separating mechanism behind the scoop, and a flat vertically-yielding shoe supported by the frame in front of the scoop to compress the vegetation in advance of the scoop but yielding vertically to prevent breakage.

6. In a potato-digger, the combination with a frame and supporting-wheels, of a scoop, separating mechanism, a heavy flat shoe located in front of the scoop and means for loosely supporting the shoe immediately in front of the scoop in a manner to effect the compression of the vegetation under the weight of the shoe, and divergent stalk-guards extending from the front of the scoop.

7. In a potato-digger, the combination with a frame and scoop, of a heavy flat shoe yieldingly supported by the frame immediately in front of the scoop, and divergent stalk-guards located at the front of the shoe and provided with downwardly-bent ends.

8. A shoe for potato-diggers comprising a flat plate having upturned front and side edges and diverging stalk-guards located at the front end of the shoe and provided with downwardly-bent ends.

In testimony that I claim the foregoing as my own I have hereto affixed my signature in the presence of two witnesses.

PETER SCHURMAN.

Witnesses:
 GEO. GODKIN,
 E. B. WILLIAMS.